UNITED STATES PATENT OFFICE.

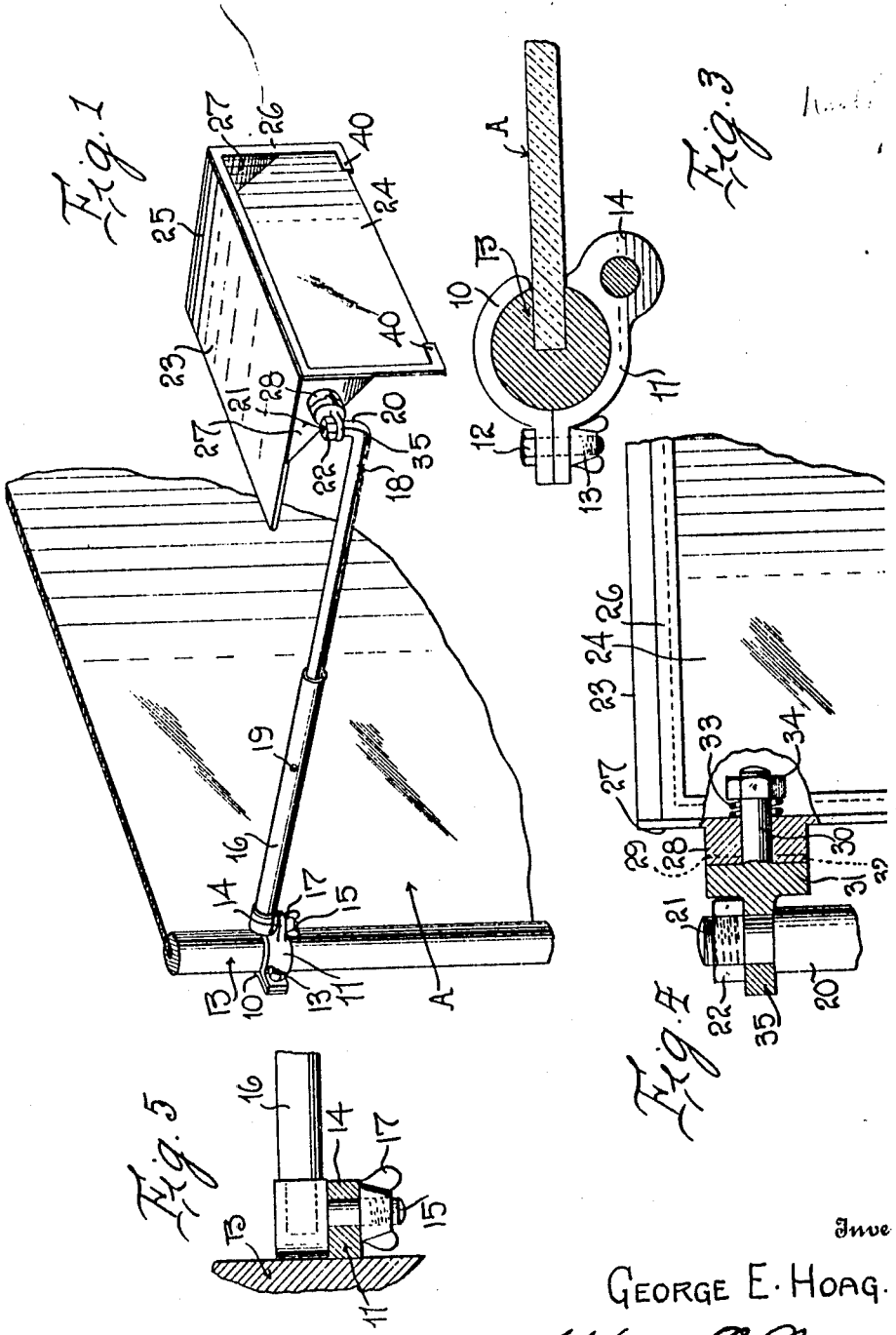

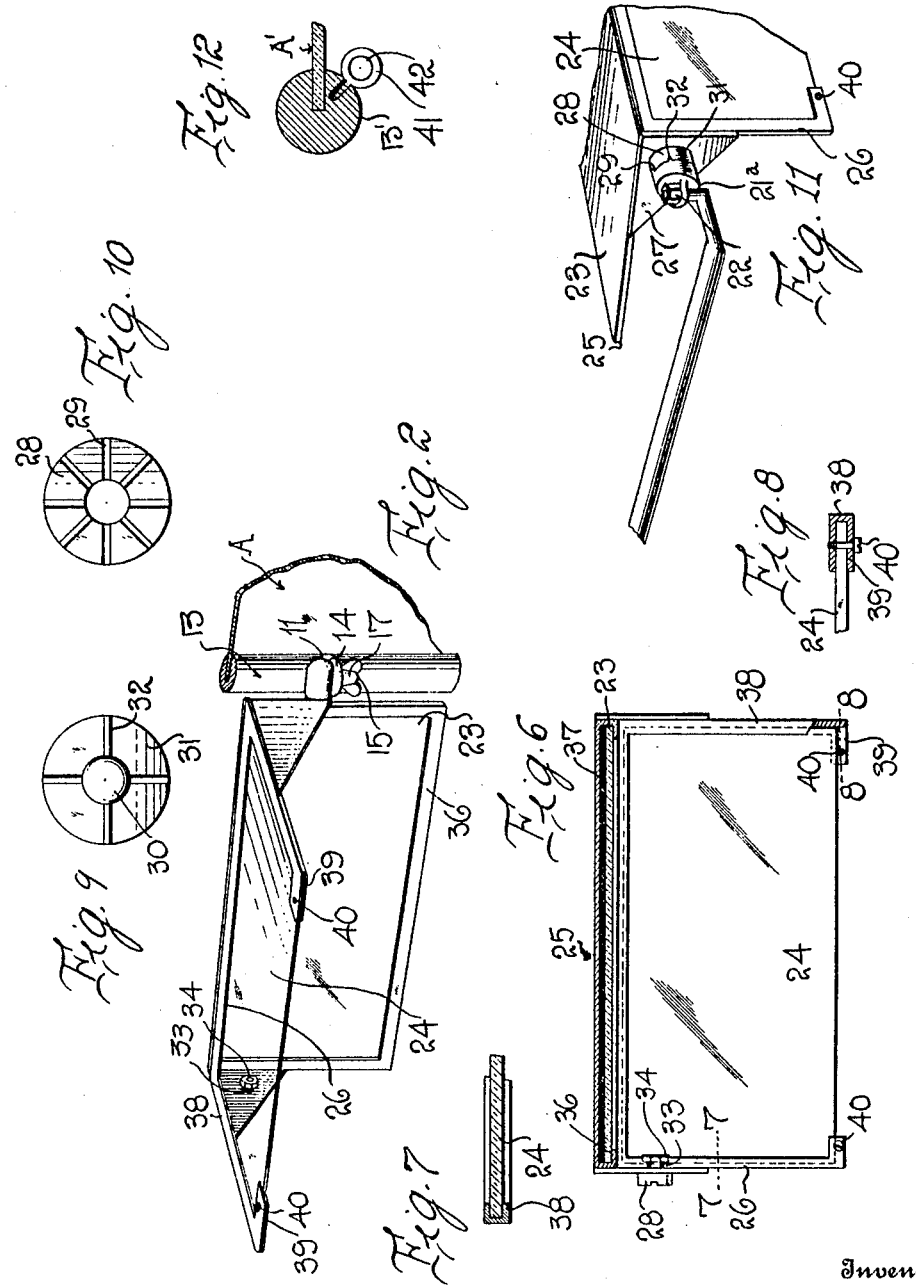

GEORGE E. HOAG, OF BURLINGTON, VERMONT.

COMBINATION EYE-SHIELD AND MIRROR ATTACHMENT FOR AUTOMOBILES.

1,178,072.

Specification of Letters Patent.

Patented Apr. 4, 1916.

Application filed December 29, 1915. Serial No. 69,247.

*To all whom it may concern:*

Be it known that I, GEORGE E. HOAG, a citizen of the United States, residing at Burlington, in the county of Chittenden and State of Vermont, have invented certain new and useful Improvements in Combination Eye-Shield and Mirror Attachments for Automobiles, of which the following is a specification, reference being had to the accompanying drawings.

My invention relates to automobile accessories or attachments and more particularly to a device primarily intended for the purpose of shielding a driver's eyes at night when he is approaching a car having a very glaring headlight.

The general object of my invention is the provision of a very simple device of this character which is so formed that it may be attached to the wind shield frame of an automobile and which includes a pane of colored or smoked glass which is adapted to be arranged in such position as to protect the driver's eyes from the glare of a headlight on an approaching automobile.

A further object of the invention is the provision, in connection with the pane of colored or smoked glass, of a mirror and in connection therewith of a mounting so arranged that when desired, the mirror may be swung into position at the side of the wind shield and reflect objects behind the automobile, while at night the attachment may be swung so as to dispose the pane of colored glass in position to protect the driver's eyes.

Still another object is to so construct the device that the mirror and pane of glass may be adjusted to various angles, as desired and in this connection to provide means whereby the mirror and pane of glass and the frame supporting these two elements may be very easily rotated in a vertical plane and automatically held in their adjusted positions.

Still another object is to improve the details of construction and provide a very firm but adjustable support for the mirror and pane of glass and provide for such a mounting of the mirror and glass that the pane of glass may be easily removed or replaced.

Other objects will appear in the course of the following description.

The invention is illustrated in the accompanying drawings, wherein,

Figure 1 is a perspective view of a portion of the wind shield of an automobile showing my device applied thereto as an eye shield; Fig. 2 is a perspective view showing a fragment of the wind shield and showing the device applied in use as a mirror to reflect objects behind the automobile; Fig. 3 is a detail sectional view through a portion of the wind shield and its frame showing the clamping device whereby the support is mounted upon the wind shield; Fig. 4 is a fragmentary sectional view partly in elevation showing the manner of mounting the mirror and pane supporting frame upon the extensible arm; Fig. 5 is a fragmentary sectional view through the portion of the wind shield frame showing the manner of connecting the extensible arm to the clamp; Fig. 6 is a face view of the pane supporting frame, showing the mirror and mirror frame in section; Fig. 7 is a detail fragmentary section of the pane supporting frame; Fig. 8 is a section on the line 8—8, of Fig. 6; Fig. 9 is an inner face view of one of the swivel members; Fig. 10 is a face view of the other swivel member: Fig. 11 is a perspective view showing a modified form of extensible arm; and Fig. 12 is a cross sectional view through a corner of a wind-shield showing a modified form of supporting member.

Referring now to Figs. 1 and 2, A designates the wind shield of an automobile of any suitable construction and B one of the side posts of the frame.

My device is adapted to be mounted on either of the side posts of the frame but I have shown it as mounted on the left side post, assuming that it is a left side drive.

My device is supported upon the wind shield frame by means of a clamp formed of two sections 10 and 11 (see Fig. 3), which sections are adapted to embrace the frame of the bar B and to be held in clamping engagement thereon by means of the bolt 12 provided with a wing nut 13. The clamping member 11 is formed with the laterally projecting ear 14 which is perforated, as illustrated in Fig. 5 for the passage of a bolt 15 carried upon the inner end of an arm element 16. This bolt 15 is threaded for the reception of a wing nut 17, whereby the arm element may be rigidly clamped upon the ear 14. The arm element 16 is tubular and telescoping into the element 16 is the arm element 18, which may be held in adjusted position therein by any suitable means, as for instance by a set screw 19. It will be seen that the elements 16 and 18, together form a telescoping arm and this arm may be rotated into any desired angular position with respect to the wind shield and held in this position by the wing nut 17. In Figs. 1 and 2 the arm element 18 is upwardly turned at its extremity, as at 20 and reduced as at 21, this reduced portion being screw-threaded for the reception of a nut 22.

Mounted upon the extensible arm is a combination mirror and colored glass screen or shield. As illustrated the mirror 23 is disposed in angular relation to the glass screen or shield 24. Preferably the mirror and the screen are disposed at an angle of ninety degrees to each other but this is not necessarily the case. The mirror is carried in a frame designated 25 and the screen or shield in a frame 26. These two frames, whose detailed construction will be later stated, are suitably connected to each other and are braced to each other by means of triangular end pieces 27. One of these end pieces has formed upon it the boss 28 whose face, as illustrated in Fig. 10, is formed with a plurality of radial grooves 29, these grooves being relatively shallow and the boss being perforated for the passage of a bolt 30 projecting from a disk 31. This disk 31 upon its inner face is formed with a plurality of radial ribs 32 adapted to engage with the grooves 29 and the member 31 is held in locking engagement with the member 28 by means of a spring 33 which surrounds the bolt 30 and bears against the nut 34. Any suitable spring washer may be used in place of the coil spring illustrated, it being only necessary to provide that the parts 28 and 31 shall be capable of a slight movement from each other in order to permit the ribs 32 to clear the notches 29 and to permit the member 31 to be rotated with relation to the member 28. The member 31 is provided with an ear 35 which is perforated for the passage of the reduced portion 21 of the rod 18, this ear 35 resting against the shoulder formed on the extremity 20 and being held in firm engagement therewith by the nut 22.

The mirror 23 has a back 25 of sheet metal or like material and the side margins of this back 25 are turned over, as at 36 so as to embrace the edges of the mirror as illustrated in Fig. 6. Between the mirror end and the back 25, there is disposed a packing 37 of cushioning material so as to prevent the mirror from rattling in its frame. The frame for the glass shield 24 is formed of a strip of metal 38 which is U-shaped in cross section, as illustrated in Figs. 7 and 8, which strip extends around three margins of the glass 24. At its outer edge, however, the frame does not embrace the edge of the mirror but is cut-away as at 39 so as to permit the glass to be drawn out from between the side bars of the frame, the glass being held in place by the screws 40, as illustrated clearly in Fig. 6. The mirror frame and the frame for the glass pane 24 are disposed preferably in right-angular relation and may be brazed, soldered or otherwise connected to each other and to the triangular end pieces 27.

In the practical use of the invention, as described, the extensible arm formed by the members 16 and 18 may be turned into any desired position and the clamp formed by the members 10 and 11 may be raised or lowered upon the standard of the wind shield in any suitable manner so as to bring the mirror and screen in proper relation to the driver. During the day the device may be turned to the position shown in Fig. 2, the extensible arm being shortened or lengthened to any suitable degree and in this position the mirror is turned approximately vertically and the pan of glass extends over the mirror so that it forms a shield therefor, as illustrated in Fig. 2 and prevents rain from splashing upon the mirror. It will be obvious that the mirror may be swung to any desired angle with the extensible arm by loosening the nut 22 and rotating the supporting frame of the mirror and shield upon the extension 21 and then again tightening the nut 22. It will also be obvious that the angle of the mirror to the horizontal may be readily adjusted by simply rotating the mirror and pane supporting frame in a vertical plane until the ribs 32 have caught in the proper notches or grooves 29 in the member 28. At night, the extensible arm is shifted so as to bring the device into position between the eyes of the driver and the wind shield and the mirror and screen supporting frame is rotated so as to bring the mirror uppermost or in a horizontal plane, while the screen 24 is disposed in a vertical plane. The screen 24 is preferably of colored or smoked glass of such character that it will very greatly reduce the glare resulting from the headlight of an on-coming automobile. It will be seen that the back of the mirror, under these circumstances, protects the screen 24 from rain.

In Fig. 11, I show a perspective view of a slightly modified form of the arm member or element 18 in which the extremity of this rod 18 is laterally bent as at 20 and then again angularly bent as at 21ª to engage the ear 35 on the member 31 in the manner heretofore described. This construction gives more room to the nut and also gives more angle to the mirror in the daytime, if desired. On Ford automobiles, or any other small cars, the clamp shown in Fig. 3 need not be used but a screw 41 may be provided, as illustrated in Fig. 12 which may be put into the side frame of the wind shield, the screw being formed with a socket 42 for the reception of the pintle 15 on the rod 16. Preferably the arm sections or members 16 and 18 will be each about ten inches long and preferably the screen glass 24 and the mirror 23 will be about three inches wide by six inches long, the two being set at an angle of about ninety degrees to each other. Preferably dark green glass should be used.

It will be seen that I have provided a very convenient automobile accessory which may be readily applied to all cars, which may be used either on the left hand side or the right hand side, the members 28 and 31 being disposed upon the right hand side of the mirror and screen frame, if the support is designed to be mounted upon the right hand side of the wind shield and which may be readily disposed at any desired angle or position in order to secure the best results. If the screen glass 24 is broken, it may be readily removed or replaced or the same may be done if it is desired to change the color of the screen glass. The mirror or the screen glass may be set at any desired angle and held at this angle.

While I have illustrated certain details of construction and arrangements of parts, I wish it understood that these may be varied to suit circumstances of operation.

Having thus described this invention, what I claim is:—

1. An attachment of the character described including an eye screen, a mirror disposed at an angle to the eye screen, a supporting member, and means connecting the combined mirror and eye screen to the supporting member, said means permitting rotation of the combined eye screen and mirror to bring either the eye screen or the mirror into operative position.

2. An attachment of the character described including a transparent eye screen, a mirror disposed at an angle to the eye screen, an arm to which the screen and mirror are mounted for rotation, and means for swingingly supporting the arm upon a portion of an automobile.

3. An attachment of the character described including a transparent eye screen and a mirror arranged in angular relation to each other, a supporting arm, means at one end of the mirror and screen for rotatably supporting them upon the arm, and means for swingingly connecting the arm to a portion of an automobile.

4. An attachment of the character described including an eye screen and a mirror arranged at an angle to each other, an extensible arm to one end of which the mirror and eye screen are rotatably attached, means for swingingly engaging the other end of the arm to a portion of an automobile.

5. An attachment of the character described including a supporting arm, angular frames supported upon said arm for rotation in a plurality of planes, a mirror supported in one of said frames and a transparent eye screen supported in the other frame.

6. An attachment of the character described including a supporting arm, a conjoined mirror frame and screen frame disposed at an angle to each other, and mounted upon the arm for rotation in a plane parallel thereto and at right angles thereto, an eye screen mounted in one of said frames, and a mirror mounted in the other frame.

7. An attachment of the character described including an arm formed of telescoping sections, a mirror and eye screen disposed at an angle to each other, a frame supporting the mirror and eye screen, a member having rotatable engagement with the arm, in a horizontal plane, and means rotatably engaging the mirror and screen frame with said member for rotation in a vertical plane.

8. An attachment of the character described including a supporting arm having means at one end for swingingly engaging it with a portion of an automobile, said arm being formed of telescoping sections, one of said sections at its extremity being angularly bent, a frame adapted to support an eye screen and a mirror at an angle to each other, said frame having an outwardly projecting boss, said boss having rotatable engagement with the last named section of the arm and having a bolt passing through the boss, the confronting faces of the boss and member being formed with interlocking grooves and tongues, and means yieldingly urging said boss and member toward each other.

9. An attachment of the character described including a mirror and a transparent pane of glass forming an eye screen and disposed at right angles to the mirror, and means for supporting the attachment with the mirror or eye screen either in a vertical position, the screen affording a protection to the mirror and extending outwardly from its upper edge when the mirror is in a vertical position.

10. In a device of the character described, a mirror frame and an eye screen frame disposed at an angle to each other, the mirror frame having a solid back and inwardly turned margins, the eye screen frame being U-shaped in cross section to embrace the side edges of the screen, one edge of the eye screen frame being cut-away to permit the removal of the screen, a mirror and a screen disposed in said frames, means for holding the frames at an angle to each other, and means for rotatably and swingingly mounting the conjoined frames.

11. An attachment of the character described including a clamp formed of opposed semi-circular sections with means for contracting said sections, said clamp having a perforated lug, an extensible arm having an angular bolt passing through said lug, whereby the arm may be rotated in the plane of the lug, the extremity of the arm being angularly bent, a conjoined mirror and screen frame supporting a mirror and an eye screen at an angle to each other, a member upon which said screen is pivoted for movement in a horizontal plane, said member having a perforated lug engaging over the upwardly turned end of said arm, and a nut holding said member in place upon the arm.

12. The combination with the wind-shield of an automobile, of an extensible arm vertically adjustable upon the frame of the wind-shield, said arm being rotatably mounted with relation thereto, a mirror and an eye screen disposed in angular relation to each other, and mounted upon the extremity of the arm for bodily movement in a horizontal plane and rotative movement in a vertical plane.

13. The combination with the wind-shield of an automobile, of an extensible and adjustable arm detachably connected to the frame of the wind-shield, and mounted for rotation in a horizontal plane, a mirror and a transparent colored eye screen disposed at right angles to each other, and means for supporting the mirror and the screen upon the extremity of said arm, said means permitting the mirror and screen to be rotated in a horizontal plane about the end of the arm as an axis and rotated in a vertical plane to dispose either the mirror or the screen in a vertical position.

In testimony whereof I hereunto affix my signature in the presence of two witnesses.

GEORGE E. HOAG.

Witnesses:
    JOHN HEBERT,
    M. C. GRANDY.

Copies of this patent may be obtained for five cents each, by addressing the "Commissioner of Patents, Washington, D. C."